April 1, 1952     H. RADFORD     2,591,375
COOLING DEVICE FOR DRINKS, SOUPS OR THE LIKE
Filed March 29, 1948
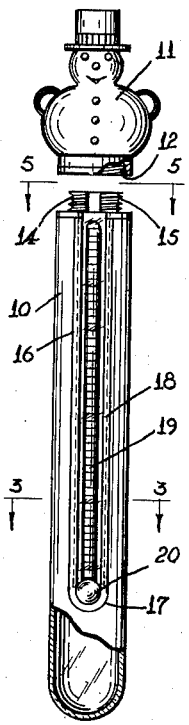
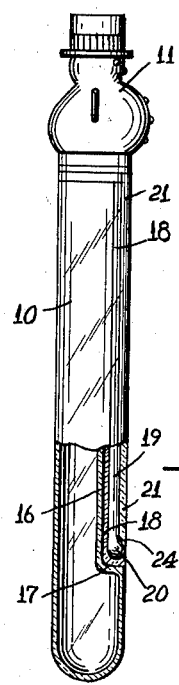
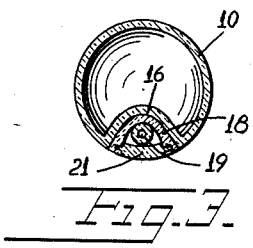
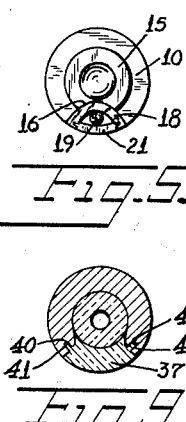
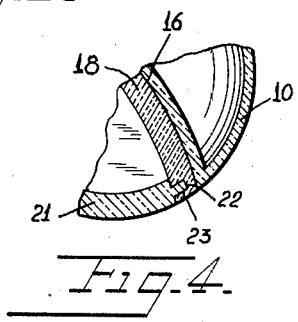
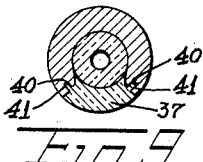
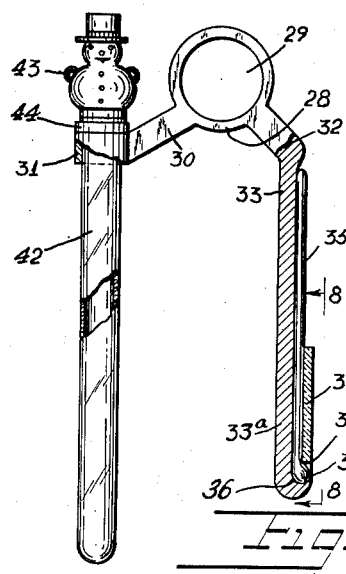
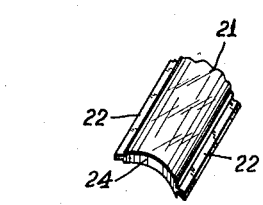
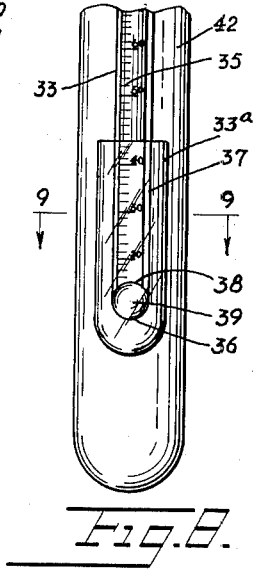
INVENTOR.
HENRY RADFORD
BY
ATTORNEY Patented Apr. 1, 1952

2,591,375

UNITED STATES PATENT OFFICE 2,591,375

COOLING DEVICE FOR DRINKS, SOUPS, OR THE LIKE

Henry Radford, Brooklyn, N. Y.

Application March 29, 1948, Serial No. 17,616

5 Claims. (Cl. 62—1)

This invention relates to new and useful improvements in cooling devices for drinks, too-hot soups, or the like.

According to the invention, an appliance is provided, to be lowered into a glass or other vessel containing the liquid to be cooled and there left for as long a time as needed to cool such liquid as desired, and incorporating an openable and closable container for such a refrigerant as say Dry Ice, in combination with a thermometer attached to said container in such manner as to be lowerable therewith into and to remain in said glass or vessel as long as said container is left therein; whereby inspection of the appliance while it remains in the liquid allows the thermometer to be read for advice as to whether or not said liquid has attained the desired reduction in temperature.

In one form of the invention, the container and the thermometer are assembled in close adjacency, but with a heat-insulative mounting for the thermometer, so that the latter will register the temperature of the liquid being cooled without being thermally affected by the temperature of the Dry Ice or the like in the container.

In another form of the invention, the parts are so combined that there is a bridging and heat-insulative handle from which, in spaced relation across the handle, the cooling container and the thermometer are suspended.

A particular object of the invention, in regard to both these forms of the invention, is to provide a dependable, rugged and long enduring appliance, and yet one of simple and inexpensive components and which may be assembled easily and at small cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a front elevational view of the cooling device having portions thereof broken away to reveal interior construction.

Fig. 2 is a side elevational view of the cooling device having the bottom portion thereof broken away to reveal interior construction.

Fig. 3 is a horizontal sectional view taken on the line 3—3 of Fig. 1.

Fig. 4 is an enlarged detailed view of a portion of Fig. 3.

Fig. 5 is a plan view taken on the line 5—5 of Fig. 1.

Fig. 6 is a perspective view of the bottom portion of the slide per se.

Fig. 7 is a side elevational view of the cooling device constructed in accordance with a modification of the invention and having portions thereof broken away to reveal interior construction.

Fig. 8 is an enlarged partial front elevational view looking in the direction of the line 8—8 of Fig. 7.

Fig. 9 is a horizontal sectional view taken on the line 9—9 of Fig. 8.

Referring to the drawing more in detail, and first to Figs. 1-6, the cooling device comprises a container in the form of a tube 10 of Pyrex glass or the like, in which the Dry Ice or the like may be placed, after removing a decorative closing cap 11, having internally a thread 12 matching a thread 14 at an upper neck portion 15 of the tube 10. After placing a charge of the refrigerant in the tube, the cap is re-applied tightly.

The tube 10 is generally cylindrical, but over a considerable portion of its length along one side it is formed with an external recess 16 of substantially semi-circular cross-section. The recess has a semi-circular bottom end 17.

The recess 16 is lined with suitable hot-cold insulation material 18 to isolate a thermometer 19 disposed in the recess from the cooling material in the tube 10. The thermometer 19 is disposed in the recess with its bulb 20 resting on the semi-circular bottom end 17 of the recess. A slide 21 is removably mounted in position across the open side of the recess 16. The slide 21 is formed at its sides with projecting tongues 22 which slidably engage complementary grooves 23 formed along the sides of the recess 16 for removably retaining the slide 21 in position. When the decorative cap 11 is removed from the top end of the tube 10, the slide 21 can be slid from the top of the tube 10 permitting the thermometer 19 to be removed.

The slide 21 is formed with a semi-circular bottom end 24 which cooperates with the semi-circular bottom end 17 of the recess 16 in forming a circular opening which engages about the bulb 20 of the thermometer 19 and through which the bulb 20 of the thermometer is exposed to be in direct contact with the liquid the cooling device is inserted into, so that the reading on the thermometer will be directly influenced by the temperature of the liquid. Thus, the semi-circular bottom end 24 on the slide 21 completes the opening for the bulb 20 of the thermometer 19 and also serves to secure the thermometer in position by extending across the top of the bulb 20. This latter function is particularly important in preventing the thermometer 19 from slipping from the open top end of the tube 10 when the decorative cap 11 is removed.

While the tube 10 is shown on the drawing as formed of Pyrex glass, it could also be formed of metal or other non-transparent material. It is important however, that the slide 21 be formed of Pyrex glass or other similar transparent material in order that the graduations on the thermometer may be easily read through the slide 21.

Referring to the form of the invention shown in Figs. 7, 8 and 9, a hanger 28, having a fingerhole handle portion 29, and made of a suitable material of high heat-insulation properties, is provided at the lower end of a leg 30 thereof with a sleeve formation 31, while the hanger's other leg 32 has a laterally offset depending extension 33 formed over its lower end with a trough 33ª, having an open top and side, this trough having an internal diameter very slightly greater than the maximum horizontal diameter of a thermometer 35.

The thermometer 35 is lowered into the trough 33ª, to seat its bulb 39 in the semi-circular bottom 36 of the trough, and with a considerable length of the calibrated stem of the thermometer projected above the top of the trough, the thermometer is protectively held in place in the trough 33ª by insertion of a slide 37 across the open side of the trough. The slide has a semi-circular bottom end 38 which cooperates with the semi-circular bottom 36 of the trough 33ª in forming an opening through which the bulb 39 of the thermometer 35 is exposed.

The sides of the slide are formed with tongues 40 which engage complementary grooves 41 formed in trough 33ª at the sides of the open side for slidably retaining the slide in position.

A tube 42 for containing a charge of Dry Ice or the like, is provided with a removable decorative cap 43, which is threadedly couplable with the tube 42. The tube 42 may be of cylindrical cross-section, internally and externally, from end to end, or of any other desired shape. As here shown, the same is cylindrical, but with an external collar 44. Then, with the internal diameter of the sleeve 31 slightly greater than the external diameter of the main length of the tube 42 but smaller than the diameter of the collar 44, the tube 42 may hang by gravity in the sleeve 31 for suspension from the hanger 28, or be easily removed from said hanger, as for convenience in adding a charge of Dry Ice or the like.

In using either form of the invention, the appliance is merely partially yet sufficiently submerged into the liquid to be cooled and left therein, with the bottom of the appliance resting on the bottom of the liquid containing vessel, and with the top of the appliance above the surface of the liquid. Therefore, the length of the appliance will be prolonged to an appropriate extent. When the appliance of Figs. 7, 8, and 9 is used in connection with a tall slender glass, the objection may be made that the degree of separation between the tube 37 and the thermometer 35 is too great, as the parts appear to be relatively dimensioned in the drawing; but, as will be understood, desired changes of dimensions are of course within the invention.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent, is:

1. In a cooling appliance having an elongated container for a refrigerant, an elongated thermometer, said container having an elongated recess opening to one side thereof, insulation material lining the walls of said recess and having a recess exposed to the open side of said recess of the container, said thermometer being positioned in the recess of said insulation material, and a removable slide closing the open side of the recess of said insulation material removably retaining said thermometer in position in the recess of said insulation material.

2. In a cooling appliance having an elongated container for a refrigerant, an elongated thermometer, said container having an elongated recess opening to one side thereof, insulation material lining the walls of said recess and having a recess exposed to the open side of said recess of the container, said thermometer being positioned in the recess of said insulation material, and a removable slide closing the open side of the recess of said insulation material removably retaining said thermometer in position in the recess of said insulation material, said slide having a semi-circular bottom end cooperating with a semi-circular bottom end of the recess of said lining material forming an opening through which the bulb of said thermometer is exposed.

3. In a cooling appliance having an elongated container for a refrigerant, an elongated thermometer, said container having an elongated recess opening to one side thereof, insulation material lining the walls of said recess and having a recess exposed to the open side of said recess of the container, said thermometer being positioned in the recess of said insulation material, and a removable slide closing the open side of the recess of said insulation material removably retaining said thermometer in position in the recess of said insulation material, said slide being of transparent material so that said thermometer can be viewed therethrough.

4. In a cooling appliance having an elongated container for a refrigerant, an elongated thermometer, said container having an elongated recess opening to one side thereof, insulation material lining the walls of said recess and having a recess exposed to the open side of said recess of the container, said thermometer being positioned in the recess of said insulation material, and a removable slide closing the open side of the recess of said insulation material removably retaining said thermometer in position in the recess of said insulation material, said recess of said insulation material being open at its top end, the walls of said insulation material defining the sides of the recess thereof having inwardly facing laterally aligned grooves, tongues extending laterally from the sides of said slide and engaging said grooves, said grooves being open to the top of the recess of said insulation material so that the slide can be removed by being pulled out of the open top of that recess, and means closing the open top of the recess of said insulation material to retain said slide and said thermometer in position in that recess.

5. In a cooling appliance having an elongated container for a refrigerant, an elongated thermometer, said container having an elongated recess opening to one side thereof, insulation material lining the walls of said recess and having a recess exposed to the open side of said recess of the container, said thermometer being positioned in the recess of said insulation material, and a removable slide closing the open side of the recess of said insulation material removably retaining said thermometer in position in the recess of said insulation material, said recess of said insulation material being open at its top end, the walls of said insulation material defining the sides of the recess thereof having inwardly facing laterally aligned grooves, tongues extending laterally from the sides of said slide and engaging said grooves, said grooves being open to the top of the recess of said insulation material so that the slide can be removed by being pulled out of the open top of that recess, and means closing the open top of the recess of said insulation material to retain said slide and said thermometer in position in that recess, the elongated container having a top for introduction of the refrigerant, said closure means comprising a cap closing the open top of the container, said cap being of a diameter to extend across and close the open top of the recess of said insulation when in position closing the open top of the container.

HENRY RADFORD.

REFERENCES CITED

The following references are of record in the file of this patent:

UNITED STATES PATENTS

| Number | Name | Date |
|---|---|---|
| 523,253 | Williams | July 17, 1894 |
| 1,724,804 | Root | Aug. 13, 1929 |
| 1,980,533 | Kile | Nov. 13, 1934 |
| 2,327,014 | Buller | Aug. 17, 1943 |
| 2,435,493 | Cary | Feb. 3, 1948 |
| 2,444,416 | Bergman | July 6, 1948 |
| 2,462,757 | Loycz | Feb. 22, 1949 |

FOREIGN PATENTS

| Number | Country | Date |
|---|---|---|
| 862,462 | France | Dec. 9, 1940 |